United States Patent [19]

Arulpragasam et al.

[11] 3,729,716

[45] Apr. 24, 1973

[54] INPUT/OUTPUT CHANNEL

[75] Inventors: Jeganandaraj A. Arulpragasam, Redondo Beach, Calif.; John F. Minshull; Alan S. Murphy, both of Hampshire, England

[73] Assignee: International Business Machines Corporation, Armonk, N.Y.

[22] Filed: Feb. 12, 1971

[21] Appl. No.: 114,770

[30] Foreign Application Priority Data

Dec. 29, 1970 Japan ....................45/121940
Feb. 13, 1970 Great Britain....................6,968/70

[52] U.S. Cl.....................340/172.5
[51] Int. Cl.....................G06f 3/00, G06f 15/16
[58] Field of Search....................340/172.5

[56] References Cited

UNITED STATES PATENTS

| | | | |
|---|---|---|---|
| 3,409,880 | 11/1968 | Galler et al. | 340/172.5 |
| 3,566,358 | 2/1971 | Hasbrouck | 340/172.5 |
| 3,449,722 | 6/1969 | Tucker | 340/172.5 |
| 3,588,831 | 6/1971 | Figueroa et al. | 310/172.5 |
| 3,573,741 | 4/1971 | Gavril | 340/172.5 |
| 3,439,340 | 4/1969 | Gallaher | 340/172.5 |

*Primary Examiner*—Gareth D. Shaw
*Attorney*—Owen L. Lamb, William N. Barret, Jr. and J. Jancin, Jr.

[57] ABSTRACT

A multiplex input/output (I/O) channel in which channel functions are carried out by associative stores. Three associative stores are used, a control store, an address store and a data store. The data store acts as a data buffer store and also handles most of the interchange of control signals between the channel and the I/O control units. Tag-in I/O signals are used directly as keys in table look-up on interface response tables and initiate the appropriate response from the channel. The address store assemblies the main store address and is also responsible for some of the tag-out I/O signals. Subchannels are allotted only when they are needed. There are a limited number of subchannel areas and these are marked when they are allotted to control units. An extra marker identifies the subchannel currently in use. Any control unit can be allotted to any subchannel.

11 Claims, 11 Drawing Figures

CONTROL STORE

FIG. 2
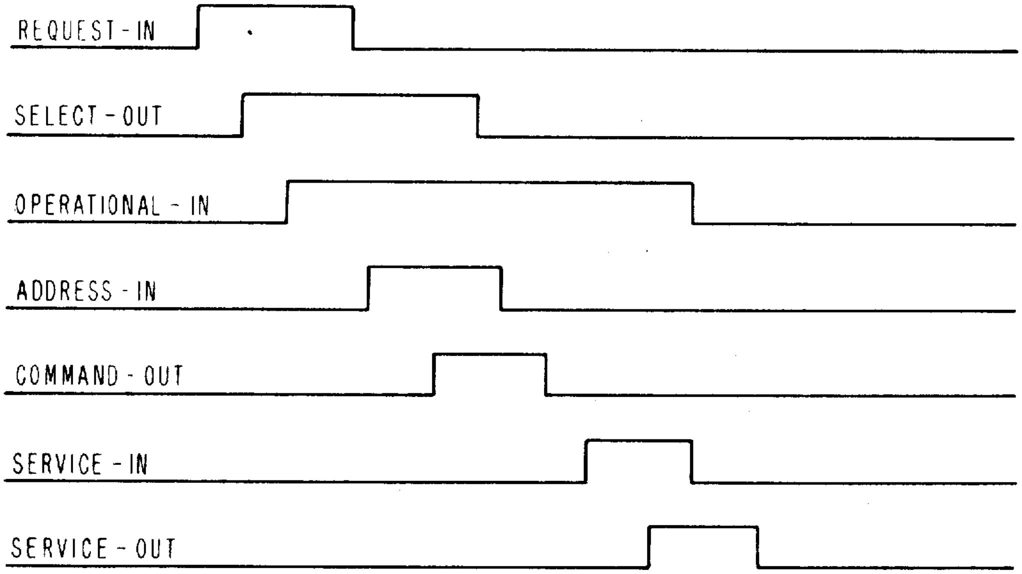
FIG. 7 DATA STORE (SUB CHANNEL AREA-100)
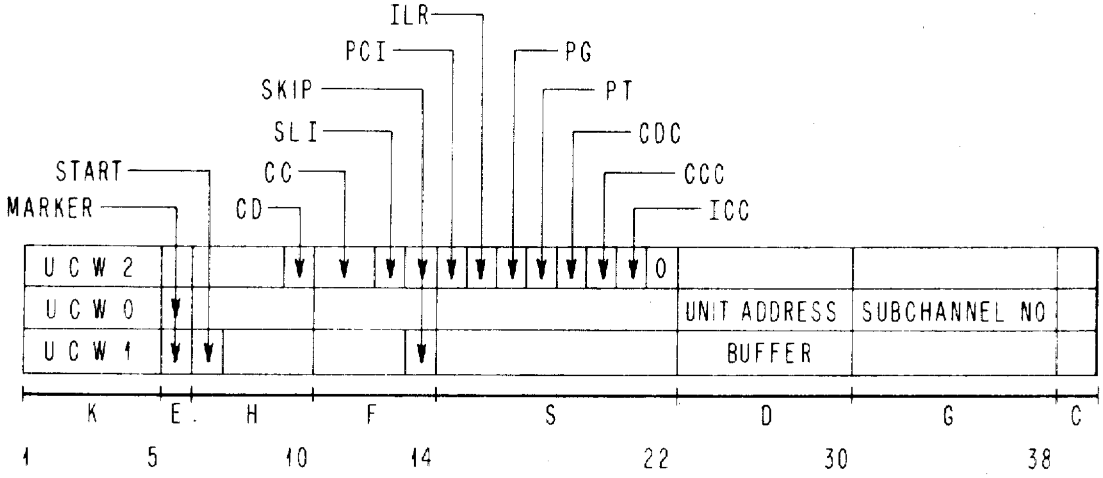
FIG. 8
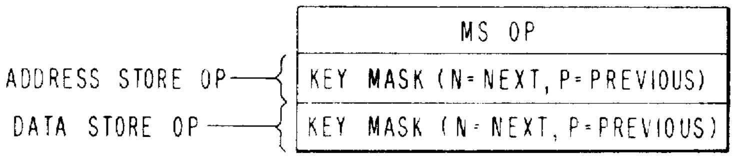

Patented April 24, 1973 3,729,716

8 Sheets-Sheet 4

DATA STORE

DATA STORE

INPUT/OUTPUT CHANNEL

BACKGROUND OF THE INVENTION

This invention relates to an electronic data processing system and more particularly to an input/output channel for controlling the operation of input/output devices.

The efficiency of a data processing system depends largely on the manner in which the system deals with the transfer of data between itself and input/output devices of varying speeds and kinds. Direct control of such devices is virtually impossible due to the greatly different operating rates of the devices with respect to the system, and of different operating characteristics of the device. The arrangement currently adopted is to leave the control of input/output operations to apparatus called a data channel. The central processing unit (CPU) of the data processing system initiates an input/output operation and the channel then automatically controls execution of the operation, also acting as buffer storage for any data involved in the operation. After initiating the I/O operation, the CPU is free to execute other instructions. The channel interrupts the CPU either when the input/output operation is complete, or as soon as it knows that the operation cannot be completed.

Generally, many input/output (I/O) devices are connected to a channel. In some machines the number can be as high as 256. It is an important function of the channel to establish and maintain communication with the I/O devices involved in the operation, especially when the channel is a multiplex channel, i.e., is capable of handling several operations simultaneously by repeatedly and successively communicating with each of the devices involved in the operations. To establish communication it has been found necessary to generate an interchange of control signals over an I/O interface connecting the channel with control units which control the devices, each signal of the interchange marking that a certain stage in the operation has been successfully reached. As an example of one such interface, see U. S. Pat. No. 3,336,582, W. F. Beausoleil et al., Interlocked Communication System, filed Sept. 1, 1964 and issued Aug. 15, 1967, which discloses the I/O interface between the channel and an input/output control unit in a typical data processing system. In this type of interface (some sequences of which are shown in FIG. 2) an I/O control unit starts a sequence by signalling to the channel with Request-in. The channel responds with Select-out. The control unit responds with Operational-in and Address-in at the same time identifying itself by sending its address over a bus in. When the address has been recognized by channel, the channel sends the response Command-out, which tells the control unit to proceed. Assuming that the operation involves data transfer, the control unit after Command-out has fallen, transmits Service-in, together with one byte of data on bus in. When the data has been received and stored, the channel raises Service-out, in response to which the control unit drops Operational-in and Service-in, after which Service-out drops. Although this is a relatively simple control signal interchnage, it is exemplary of the interdependence of the signals, and it will be readily understood that circuitry to detect and transmit the signals is complex and difficult to modify, should the need arise.

BRIEF SUMMARY OF THE INVENTION

In accordance with the invention, an electronic data processing system comprises an input/output channel which is arranged to control the operation of input/output control units and which includes an associative store and means for connecting the associative store to the control units over an I/O interface, wherein the associative store contains a function table, the entries in which comprise data representing control signals to be transmitted over the I/O interface by the channel, which entries are arranged to be read from the table in at least one table look-up operation for which control signals from a control unit provide at least part of the search argument.

The invention thus provides that the signals transmitted by the channel are stored as data in an associative store and are accessed in response to reception by the channel of signals from the control unit. The arrangement is cheaper to provide than special circuitry, especially with the development of monolithic storage circuits, and the signal sequence can be changed simply by changing the data in the associative store.

The associative store can also be used to store data relating to input/output operations currently being controlled by the channel and to provide buffer storage for information being transferred between the data processing system and the input/output.

The multiple uses which can be made of the store, reduce the complexity and increase the cost-efficiency of the channel substantially.

The foregoing and other objects, features and advantages of the invention will be apparent from the following more particular description of the preferred embodiments of the invention, as illustrated in the accompanying drawings.

FIG. 2 is a timing chart showing signal interchange between a channel and an input/output control unit;

FIG. 7 shows the lay-out of the subchannel area in the data store;

FIG. 8 is explanatory of the arrangement of FIGS. 9 and 10; and

Figure 1:
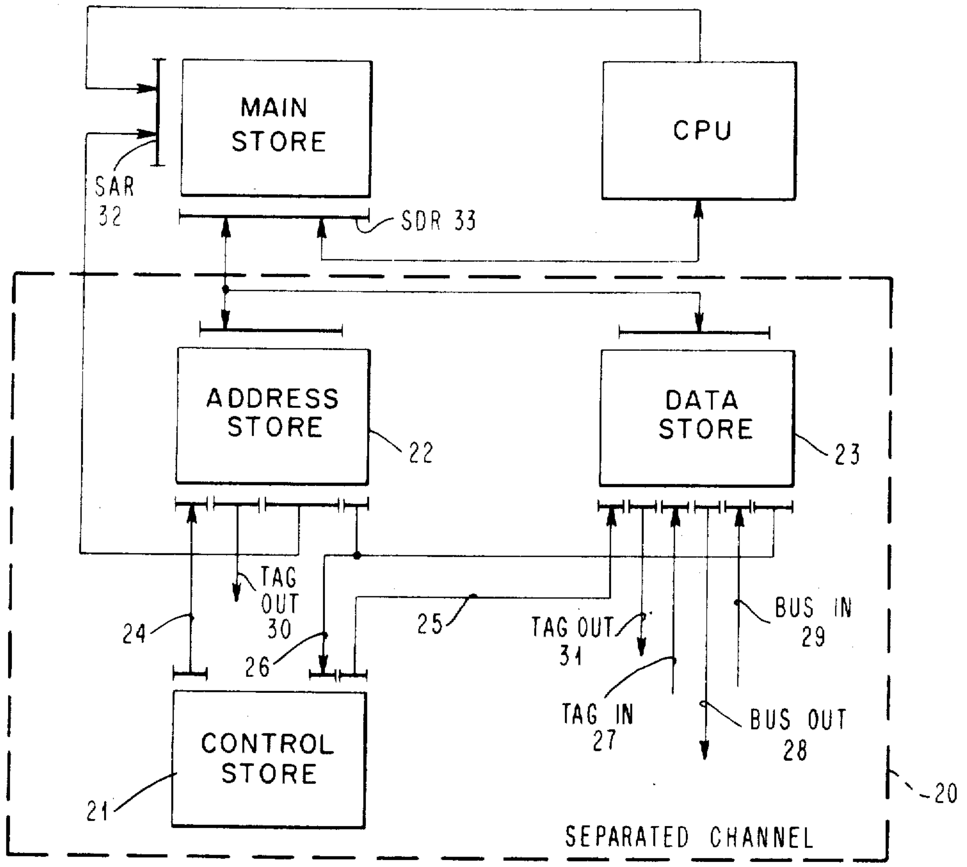
FIG. 1 is a block diagram of an electronic data processing system including a channel in which the invention is embodied.

The invention to be described is embodied in a data processing system such as that described in U. S. Pat. NO. 3,266,689, Amdahl et al. A description can also be found in the reference manual "IBM System/360 Principles of Operation", Form A22-6821.

In such a system, an input/output operation communication is established between a channel and a control unit. The control unit may be integral with an input/output device or may have several devices attached to it. The function of a control unit is to interpret the signals received from the channel into the form appropriate to a particular device, and to standardize the signals to be transmitted to the channel. It is not necessary in the practice of the invention that the channel communicate directly only with control units. The invention can be utilized in systems where communication is established directly with input/output devices and for purposes of this specification, the terms "control unit" and "devices" are used interchangeably for any input/output equipment or peripheral equipment to be used with a data processing system.

A channel provides a standard interface for connecting a central processing unit (CPU) of main store of a data processing system to different types of input/output device. It accepts control information from the CPU and changes it to a sequence of signals acceptable to the control unit and I/O device with which communication is desired. Similarly, the channel transforms signals received from a control unit to a form suitable for use by the CPU. Once channel activity has been initiated by the CPU, it can turn to other operations leaving the channel to complete the initiated activity.

Data transfer can take place between main storage and an I/O device in either a burst or a multiplex mode. In burst mode, the device monopolizes all channel controls and is transferred. The burst can be a few bytes, a block of data, or several blocks of data. In multiplex mode, the channel is shared between several concurrently operating I/O devices. The I/O devices are successively connected to the channel each for a short interval of time while a segment of data or control information is transferred. The segment may be one byte or a few bytes of data.

There are two kinds of channels which are differentiated by the modes of operation of which they are capable. A multiplex channel is capable of both burst and multiplex modes. A selector channel is capable only of burst mode. The channel facilities required for sustaining a single I/O operation are called a subchannel and consist of the channel storage used for recording the kind and the progress of the I/O operation. A selector channel has only one subchannel. A multiplexor channel has a plurality of subchannels which may be shared or unshared. Shared subchannels are used with devices that share a control unit but all devices that share a control unit, for example transmission lines, do not necessarily share a subchannel.

I/O operations are initiated and controlled by information of three kinds: instruction, commands, and orders. Instructions are part of the CPU program and are decoded by the CPU. Commands are decoded and executed by the channels and I/O devices and when linked for sequential execution form the channel program. Orders are peculiar to an I/O device and their contents are intended. An order may, for example, require the shifting of a magnetic transducer to a particular track of a disc.

An I/O operation is initiated when the CPU decodes a Start I/O (SIO) instruction which identifies the channel. The channel fetches a channel address word (CAW) from a fixed location in main storage. The CAW names the location in main storage from which a channel command word (CCW) is fetched. The CCW specifies the command to be executed and the storage area to be used. The channel then attempts to address the device by sending the address to all control units attached to the channel. If a control unit recognizes the address, it connects itself to the channel and returns the address. The channel then sends the command code of the CCW over the I/O interface and the device responds with a status byte indicating whether the command can be executed. Execution of SIO is then completed with the setting of the condition code in a program status word (PSW) and, under certain conditions, the storing of information in a channel status word (CSW). The CPU is then free to execute other instructions while the channel executes the channel program, i.e., a CCW or sequence of CCWs.

An SIO instruction usually calls for the preparation of an I/O device to transmit or receive data. For example, a transducer must be positioned over a given data track. When the device is ready, it signals a request to the channel, whereupon if channel is free, data transfer takes place in burst or multiplex mode.

A command can only call for a transfer to or from a contiguous area of storage, i.e., an area defined by an unbroken sequence of storage addresses. To enable transfer to non-contiguous areas, CCWs can be chained to provide data chaining. If a CCw contains a chain data (CD) flag, the CCW in the next sequential address in storage is fetched and the transfer continues.

A similar facility called command chaining is also provided. A command which involves data transfer can only relate to a single block of data at the I/O device. Blocks of data are defined differently according to the I/O device involved; for example, a block may comprise the contents of a single punched card. If several cards are to be punched or read as a result of one SIO instruction, command chaining provides the means for doing this. If the current CCW contains a command chaining (CC) flag, detection of this leads to the retrieval of the next CCW.

Command chaining need not be restricted to data transfer commands but, for example, can be used to cause a transducer to move to a data track while another transducer is reading or writing.

In a channel in which the invention is embodied, the interface between I/O and main storage comprises an associative store loaded with function tables whereby many of the logical and arithmetic operations, and much of the data management, necessary to control information transfer is performed by table look-up. The preferred embodiment is a multiplex channel and uses three associative stores, one assigned largely to data management, one assigned largely to data address management and a control store.

The associative store used in the embodiment to be described is a modification of that disclosed in the specification of U. K. Pat. No. 1,186,703, Ser. No. 45432/67, issued July 29, 1970. The store is word-oriented and has a two phase operating cycle. In the first phase, one or more word registers are selected by setting selector triggers connected to the registers. In the second phase, the selected word registers are accessed, i.e., data is read from or written into the registers. Usually a register is selected as a result of an associative Search operation in which data in a freely selectable field of an I/O register of the store is compared with the data occupying the same field in each of the word registers of the store. All word registers containing data matching the data in the given field of the I/O register are selected. The field will be called the search field and the contents of the field, the search argument. When table look-up is performed the table to be used is identified by a data field called the key field or the key. This is necessarily part of the search argument and in the description which follows will usually be distinguished from the remainder of the search field which can vary widely. Accessing selected word registers takes place over a freely selectable field which is called the read field or the write field in accordance with the accessing operation performed. If more than one word register is selected, a write operation consists of writing the contents of the write field of the I/O register into each selected word register; while a read operation consists of reading the contents of the read field of all selected registers simultaneously into the I/O register. The selector triggers are connected together as a shift register and the states of the triggers can be shifted to an adjacent trigger, in one direction by a Next operation and in the other direction by a Previous operation. Next or Previous operations can be combined with a Search operation. If it is assumed that word registers are numbered sequentially and a Search operation will select register 7, a Search Next operation will select register 8, while a Search Previous operation will select register 6.

The associative stores comprise, as explained in the specification referred to, and more particularly in the application of U. K. Pat. No. 1,127,270, Ser. No. 40623/67, issued Jan. 15, 1969, four state data storage cells. Two of the states represent binary zero and binary one respectively, and the remaining states are called X, or "don't care", and Y states respectively. The X state can be thought of as representing a blank character. A cell in the X state matches either a one or a zero in a Search operation, and is read as a zero. A cell in the Y state matches neither a one nor a zero in a Search operation, and thus a register with a cell in the Y state cannot be accessed by a Search if the cell is part of the search field.

The associative stores used in the embodiment have two I/O registers either of which can be used in either phase of a store operating cycle.

As will become clear from the following description, not all the processing usually done in a multiplex channel is performed by the arrangement of associative stores to be described as an example of the invention. In order to distinguish the arrangement from a complete multiplex channel, it will be called a separated multiplex channel.

FIG. 1 is a schematic block diagram of a data processing system comprising a separated multiplex channel showing the main interconnections between the associative stores comprising the separated channel, a mainstore and a CPU. The separated channel 20 consists of three associative stores, a control store 21, an address store 22, and a data store 23. Control store 21 contains microprograms which determine the operations and functions to be executed by all three associative stores. The term "operation" will be used herein to refer to an action of an associative store as a store. Search, Read, Next are operations. The term "-function" will be used to refer to the action of an associative store in performing table look-up on a function table contained in the store. Add, Increment, Shift are functions. Operations are controlled by sending data to a decoder which determines, in response to data on its inputs, the operations to be performed by a store in the next storage cycle. Functions are controlled by ending data to be used as a key forming part of a search argument. Different function tables are identified by different keys. Address store 22 is controlled by data from control store 21 transmitted over a cable 24, a data store 23 is controlled by data transmitted over cable 25. Sequencing of the microinstructions in store 21 is controlled in part by the store itself and in part by data transmitted from stores 22 and 23 over a cable 26. Communication between the separated channel and the I/O units is by way of cables called Tag-in, Tag-out, Bus-in and Bus-out respectively. The Tag cables carry control signals and the Bus cables carry data. In the separated channel, the Tag-in, Bus-in and Bus-out cables 27 to 29, respectively, are connected to data store 23. The Tag-out cable is split between address store 22 and data store 23. Certain of the control signals are transmitted from address store 22 over cable 30 and the remainder from control store 23 over cable 31.

Connected to the separated channel 20 is a main store (MS) which has an address register (SAR) 32 and a data register (SDR) 33. The contents of the SAR 32 are decoded to select a storage location of MS whereupon data transfer takes place between SDR 33 and the selected location. SDR 33 is connected to address store 22 and data store 23. SAR 32 is connected to receive address data from address store 22. The CPU is also connected to SAR and SDR but there is no direct data transfer connection between the CPU and the separated channel.

Before describing in more detail the contents and operation of the stores comprising the separated multiplex channel, the concept of subchannels will be explained.

As stated, a multiplex channel is, or can be, successively and repeatedly in communication with several control units. This necessitates the storage of a record of the operation and the current state of the operation being performed in cooperation with each control unit. The record is called a Unit Control Word (UCW) and the storage space to which it is allotted is called a subchannel. The practice in prior multiplex channels, such as described in the above-identified Amdahl patent, is to allot a subchannel permanently to each control unit. This has the advantage that the location of the UCW for a given control unit is known and is readily accessible, since the address of the control unit can be made to bear a given relationship to the address of the subchannel, but has the disadvantage that, since it is highly unlikely that all the subchannels are in use at one time, much of the storage space allotted to the subchannels is wasted. In the multiplex channel according to the present invention, the associative addressing facility of the address and data stores is used to enable only the minimum amount of storage space to be assigned to subchannels without any diminution of the number of control units which can be attached to the channel.

In the preferred embodiment, eight subchannels are provided which are not assigned to any control unit. A control unit is allotted a subchannel by storing the address of the control unit in the subchannel. The subchannel is accessed by using the unit address as part of the search argument. Further, since only one subchannel is in current use at any time, (this being a time-division multiplexed apparatus) the subchannel currently in use can be accessed by using a marker bit as part of the search field, without using the unit address. Initially the subchannels are unassigned. As requests for service are received, the subchannels are assigned to particular control units by storing control unit addresses in subchannels. The particular subchannel which is currently in active use, i.e., the channel and control unit are in communication, is further distinguished by the use of a marker bit and this is sufficient to select this subchannel from other assigned subchannels. When a control unit is disconnected from the channel at the end of an I/O operation, the subchannel is cleared and can be assigned to another control unit.

Figure 5:
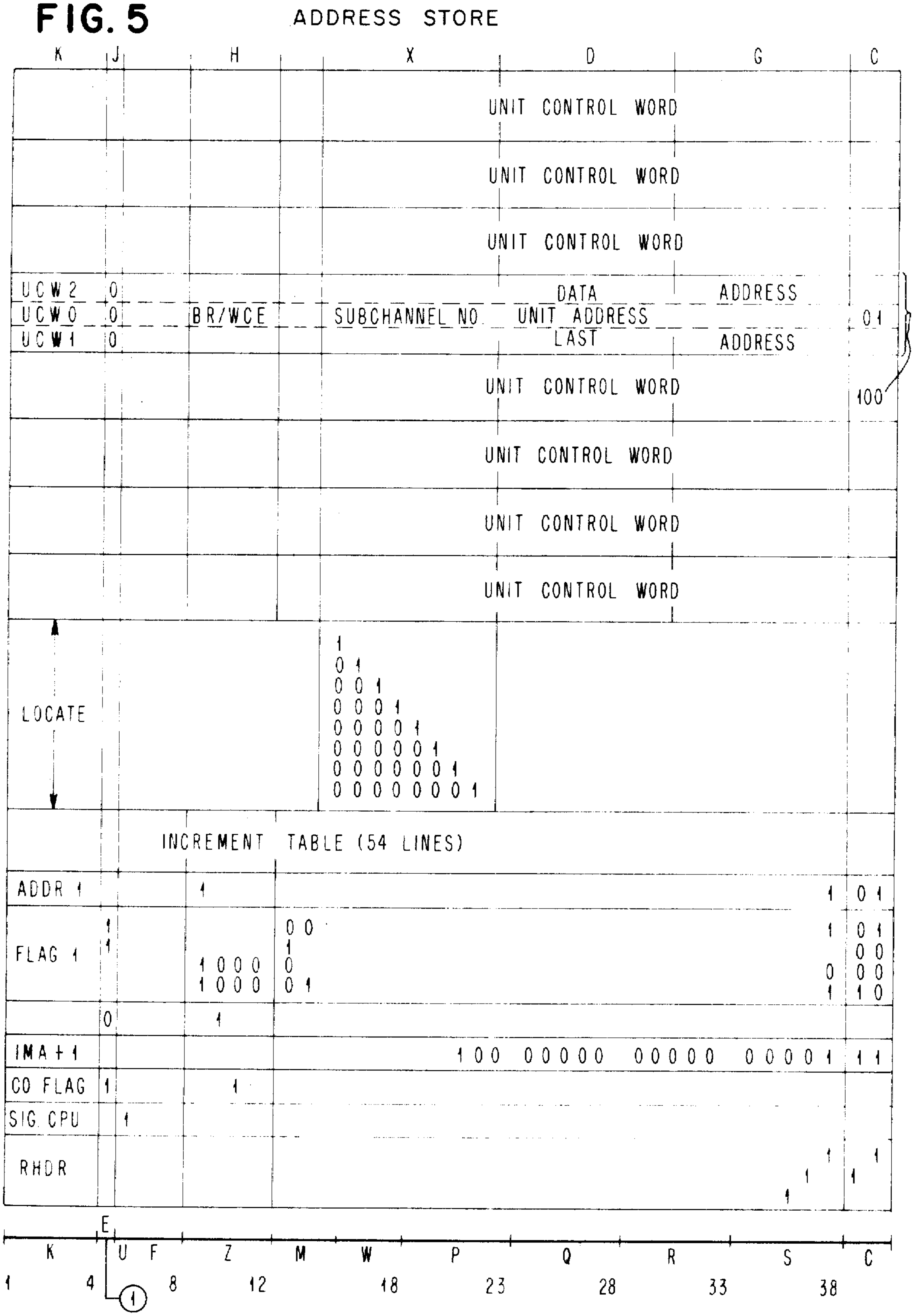
FIG. 5 shows the data content of the address store.

The separated multiplex channel has subchannel areas in both the address and the data stores. FIG. 5 shows the contents of the address store and, in particular, the area for each marked Unit Control Word, each of which form one part of a subchannel. One area 100 is shown in more detail and can be seen to comprise three lines of the address store. Each line consists of the fields K to C named along the top of FIG. 5. The K field is the key field containing an identifying tag whereby each line can be addressed, but, as will become clear when a detailed description of operations in the channel is given, the most common method of accessing the line with keys UCW1 and UCW2 is to use UCW0 as search argument in combination with a Next or Previous operation. The J field is the marker bit field. Initially zero, the bit is changed to one when the control unit to which the subchannel is assigned is actively communicating with the channel. The H field of UCW0 contains flags, which determine the operations to be performed. There is a busy flag B, a read/write flag R/W, which indicates that a data transfer is to take place between channel and the control unit, a Count = 0 flag C, and an End flag E. The C flag is normally set to one when the number of bytes remaining to be transferred in a data transfer operation reaches zero and is a signal for the procedures associated with the termination of an operation to be started. If, for any reason, a data transfer has to be stopped, this is done by setting the C flag to one. The E flag is one when the end of an operation has been detected. Not all operations are data transfer operations and the C flag is not necessarily one when the E flag is one. The X field of UCW0 contains a subchannel number and the D field the unit address. The D field is empty when the subchannel is unassigned. The D and G fields of UCW2 contain a data address and of UCW1 contain a last address. Transfers of data between a control unit and channel generally involve a block of data comprising a plurality of bytes of data and are defined to the channel by specifying the addresses of the first and last bytes of the block. The first address, called the data address, is incremented each time a byte is transferred and is compared with the last address. When the data and last addresses are equal, the C flag is set to one.

FIG. 7 shows that part of a subchannel which is located in the data store. There are eight subchannel areas each comprising three lines of the store. As in the address store each line has its own key field but the more usual method of addressing is to use key UCW0 with a Next or Previous operation. The fields are of slightly different dimensions to those in the address store as will be explained in more detail later. The E field is for the marker bit and the D and G fields of UCW0 for the address of the unit to which the subchannel is assigned and for a subchannel number, respectively. Since transfer to main store can be done two bytes at a time and transfer from the control unit is done one byte at a time, it is necessary to provide buffer storage for one of the bytes.

The D field of UCW1 is used as a buffer. The remainder of the subchannel area in the data store is used for the storage of flags. A detailed description of the flags will not be given here as their significance is not directly related to operation of the multiplex channel being described. For a description of the flags and their uses reference should be made to the reference manual and the Amdahl et al. U.S. Pat. No. 3,226,689. Flags are loaded into the subchannel area when an I/O operation is requested by the CPU. It will be noted that a skip flag is loaded into column 14 of both UCW1 and UCW2. A start bit in column 7 of UCW1 is, as will be explained, generated by the channel.

Figure 3:
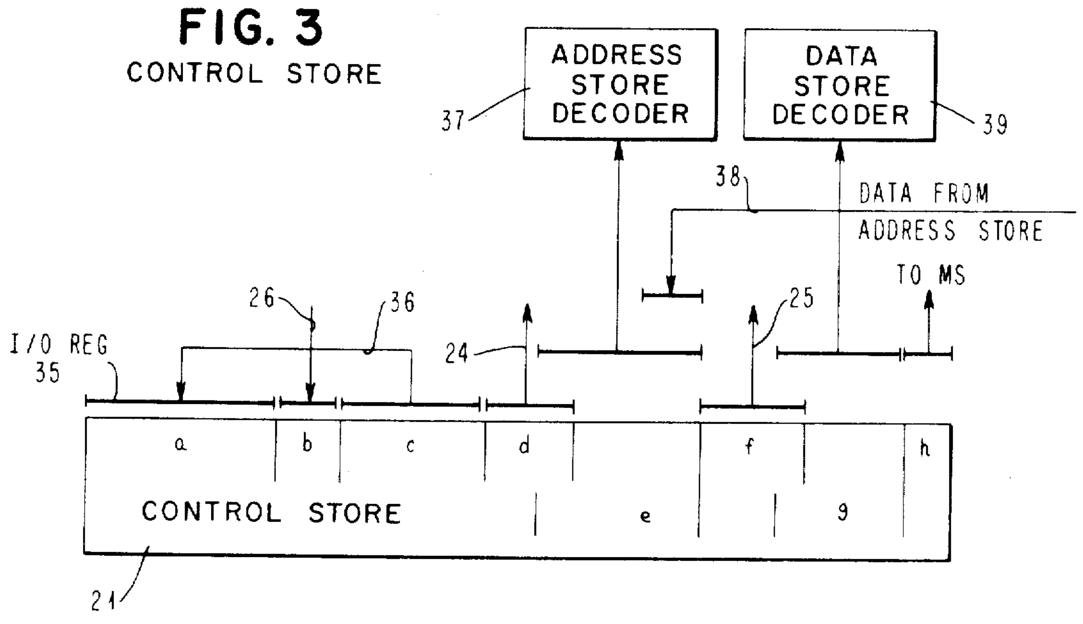
FIG. 3 is a diagram showing the control store of the channel of FIG. 2 in more detail.

The control store 21 will now be described with reference to FIG. 3. Store 21 has a single I/O register 35 which is so connected to the remainder of the separated channel as to define in the control store 21 data fields 21*a* to 21*g*. Field 21*a* is a 6 bit address field and contains the identifying address of each line of the store. Field 21*b* is a 2 bit condition field connected to receive data from store 22 and 23, as shown in FIG. 2, over cable 26. Field 21*c* is a 6 bit new address field and is connected over cable 36 to the address field 21*a* of the I/O register 35. Fields 21*d* and 21*e* control the address store 22. Field 21*d* is connected to the address store over cable 24 and is the address store key which identifies one or more function tables in the address store and thus defines the function or functions to be performed by the address store during a cycle. Field 21*e* defines both the address store operation and the mask under which the operation takes place. Field 21*e* is shown in FIG. 3 as connected to address store decoder 37. Data can also be transmitted into field 21*e* from the address store itself over cable 38, as will be explained. Fields 21*d* and 21*e* overlap by two bits which serve to define both part of the function key and part of the mask address. Fields 21*f* and 21*g* control the data store. In field 21*f* is the function key, and in field 21*g* are the mask address and operation codes. Field 21*f* is connected to the data store over cable 25 and field 21*g* which overlaps field 21*f* by two bits is connected to the decoder 39 of data store 23. Field 21*h* controls certain operations of main store (MS).

Figure 4:
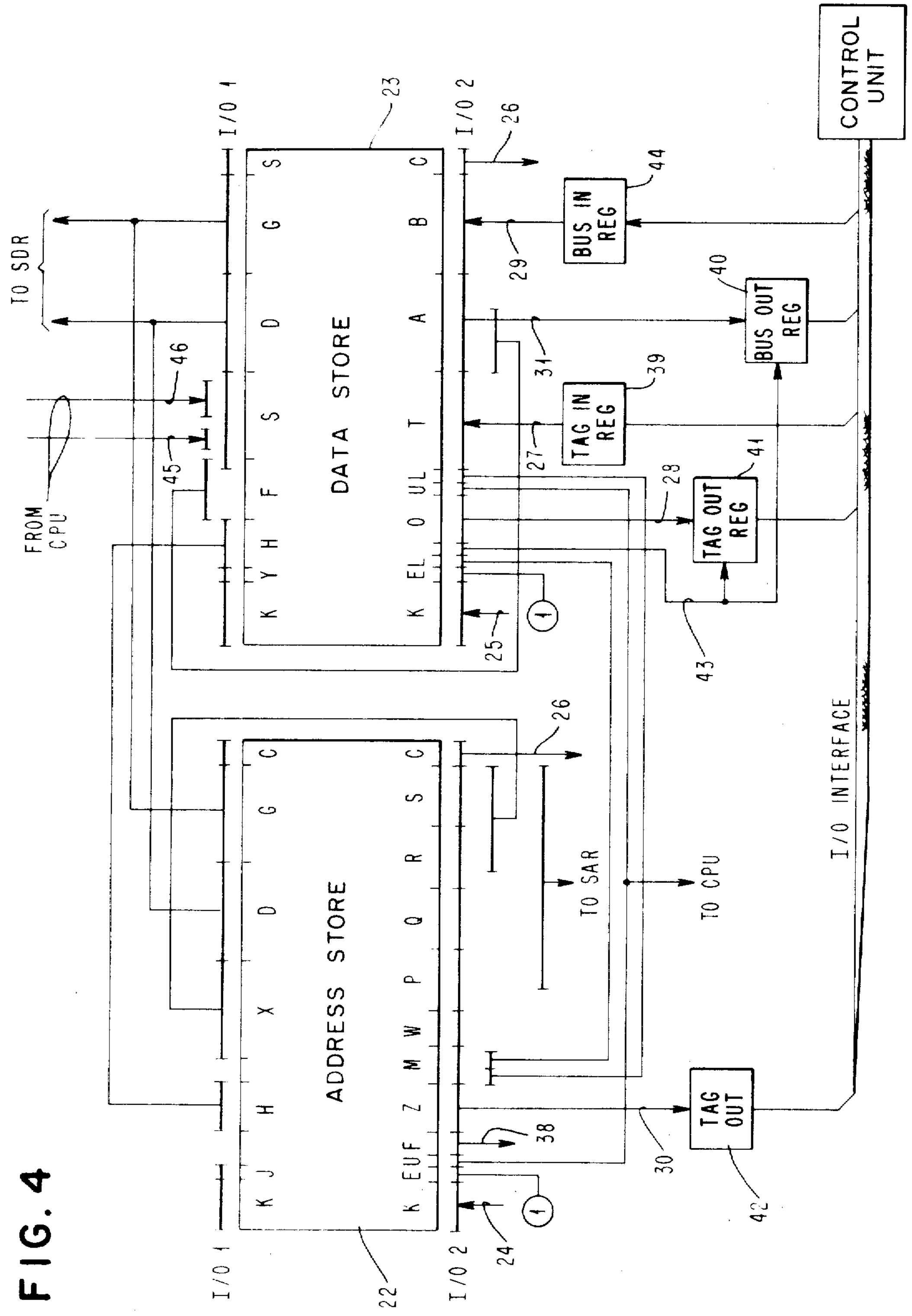
FIG. 4 is a diagram showing the data and address stores of FIG. 2 and their interconnections in more detail.

FIG. 4 shows in more detail the address store 22 and the data store 23. Both stores have two I/O registers I/O1 the data store 23. Both stores have two I/O registers I/O1 and I/O2 and both are connected so as to be capable of some auto-sequencing. This latter feature consists in arranging that the output of the store in one cycle determines or assists in determining the store function and operations for the next cycle. It is described and claimed in the specification of copending U. S. application Ser. No. 82,043, filed Oct. 19, 1970, Auto Sequencing Associative Store, John F.

Minshull et al. Associated with the stores 22 and 23, besides the I/O registers, are registers 40 to 42. These provide the interface between the separated channel and the I/O devices which are connected to the channel. Register 40 is an 8 bit Bus-out register in which data is staticized for transmission to the I/O devices. Registers 41 and 42, each of 4 bits, together comprise a Tag-out register in which control signals are staticized for transmission to the control units. Register 41 receives data from data store 23 while register 42 receives signals from address store 22.

The registers 40 to 42 comprise bistable circuits of the kind which produce a continuous output signal representative of their stable state. In the case of the registers 40 and 41, the signals are only gated to the control unit when a 1 bit is read from an out control field which occupies column 9 of the data store, to a control line 43 for the registers. This enables the A field of I/O2 to be used for data other than that which is to transmitted to the control unit. In the address store, the Z field is not used for such other data and there is no need to provide a control signal for transmitting the contents of register 42 to the control unit.

The address store 22 has two fields common to both I/O registers, a 4 bit key field K (see FIG. 5) which receives data from control store 21 over cable 24 and a 2 bit condition code field C which transmits data to the control store over cable 26. The remaining fields of I/O1 are a 4 bit H field and 8 bit X, D and G fields. The D and G fields are connected to SDR 33 to main store. Besides the K and C fields, I/O2 of address store 22 also holds a 1 bit E field, a 1 bit U field a 2 bit F field, a 4 bit Z field which is the data source for Tag-out register 44, 3 bit M and W fields and 5 bit P, Q, R and S fields. The right-most 8 bits of the R and S fields are connected to the X fields so that the bits can be used as part of a search argument in I/O1. The right-most 18 bits of the P, Q, R and S fields are connected to SAR 32 of main store to provide a mainstore address to be accessed. The U field is for signalling the CPU. The F field is connected to the control store 21 I/O register over cable 38 to provide data whereby the next operation to be performed by address store 22 is selected.

The data store 23 (FIG. 4) has in each I/O register a 5 bit K field connected to control store 21 by a cable 25 and a 2 bit condition code field connected to control store 21 by a cable 26. Additionally I/O1 has a 1 bit Y field, a 4 bit H field, which is connected to the H field of I/O1 of address store 22, a 5 bit F field, an 8 bit S field which overlaps the F field by one bit, and 8 bit D and G fields. The D and G fields are connected to the D and G fields of I/O1 of address store 22 and to SDR 33. Four bits of the S field are arranged to receive control signals from the CPU over cables 45 and 46. I/O 2 of data store 23 has K and C fields, a 1 bit E field, two 1 bit L fields, a 1 bit out control field, a 4 bit O field connected to transmit data to the Tag-out register 41, a 1 bit U field connected to the CPU, an 8 bit T field receiving control data over Tag-in line 27, an 8 bit A field connected to transmit data to Bus-out register 40 and an 8 bit B field connected to receive data over Bus-in line 29. The out control field is connected so that, when the field holds a one bit, signals are transmitted to Tag-out register 41 and Bus-out register 40 over cable 43 to gate the data contained in the registers to the I/O device connected to the channel at that time. The leftmost 5 bits of the A field of I/O2 are connected to the F field of I/O1. The L fields of I/O2 of the data store 23 are connected to respective bit positions of I/O2 of address store 22.

The 1 bit E fields of the I/O2 register of both address store 22 and data store 23 are permanently wired so as to represent binary ones. This has two advantageous applications. The E field is a permanently available source of data for flagging selected words. In the separated channel it is used for marking the subchannel which is currently in active use. The E field also provides a means of distinguishing between pairs of tables which are to be accessed from only one I/O register without the wasteful necessity of using different keys (K fields) for the tables of the pair. A table to be accessed from I/O1 would have a key field x with J field =0 whereas a table to be accessed from I/O2 would have a key field x with E field =1.

Figure 6A:
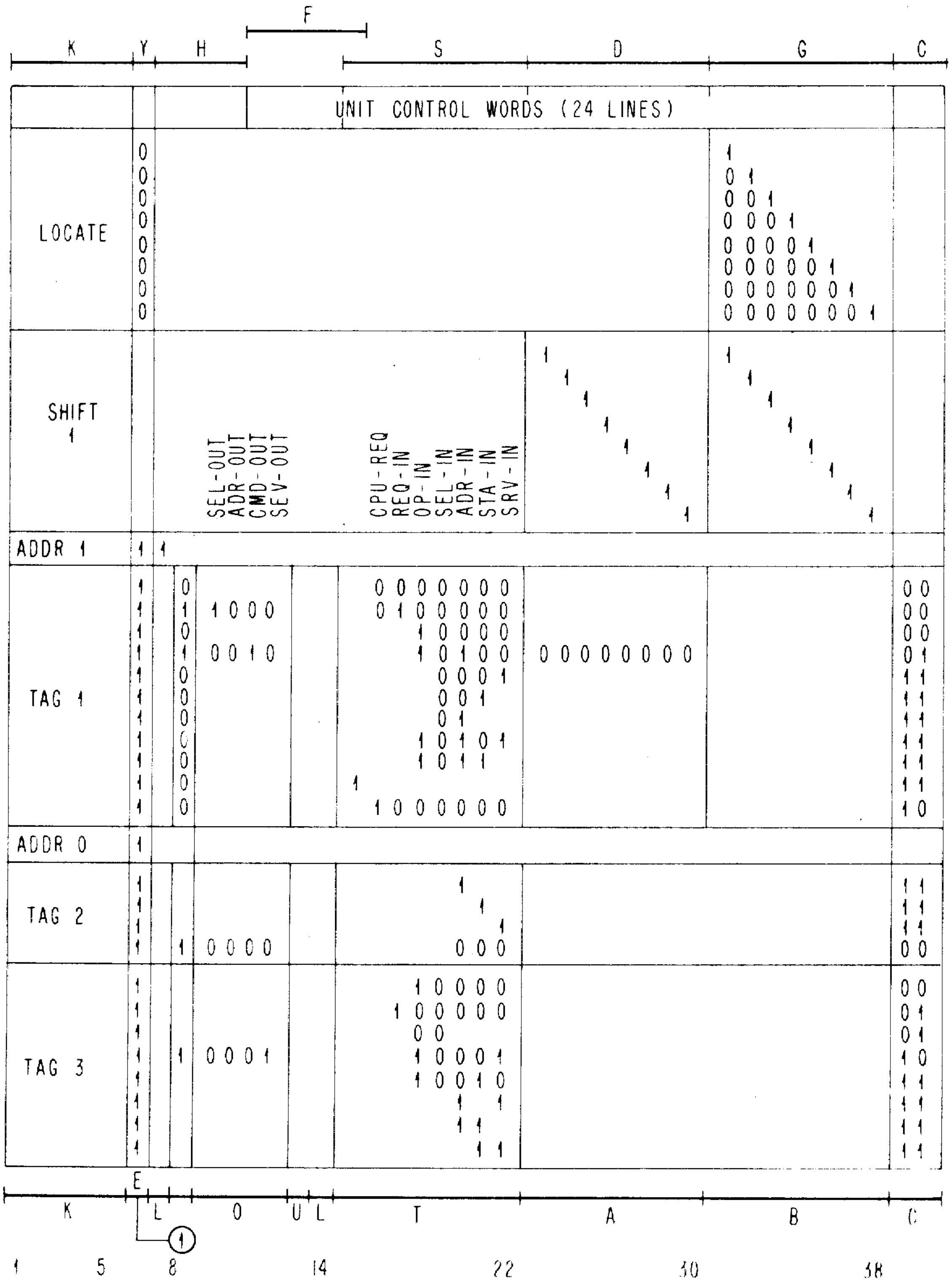
FIG. 6A and 6B show the data content of the data store.
Figure 6B:
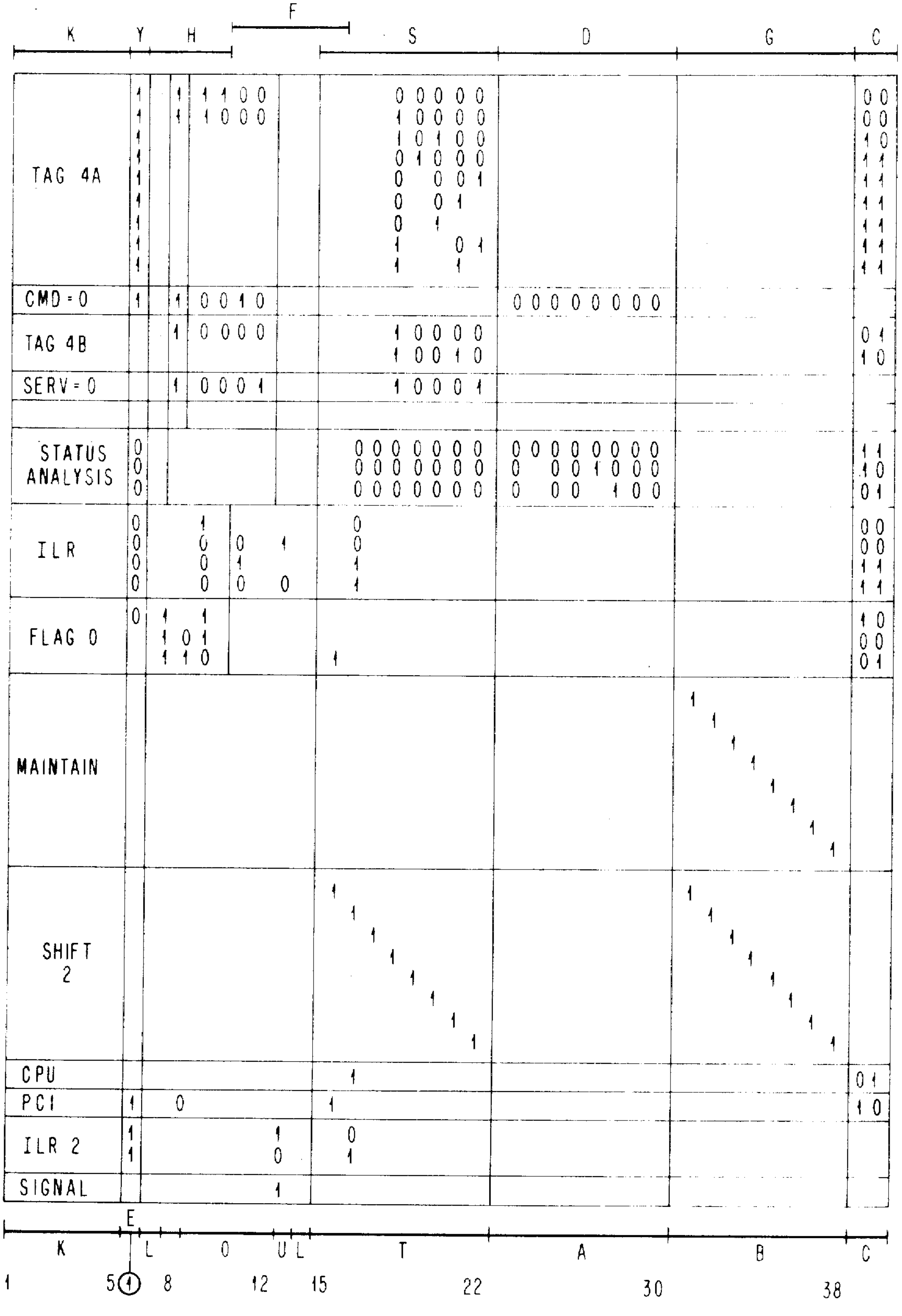

The operation of separated multiplex channel will now be described with reference to FIGS. 5 to 7 and the flow charts of FIGS. 9 and 10. The flow charts consist of rectangles connected by arrows which indicate the sequence of operations. Each rectangle contains, as shown in FIG. 8, a description of the synchronous operations performed in one cycle by main store (MS), address store 22 and data store 23. A rectangle is divided into upper, middle and lower portions. The upper portion defines the main store operation. The middle portion defines the address store operation and contains an indication of the contents of the K field and the mask used. The cycle consists of an associative search operation sometimes combined with a Next or Previous operation, followed by Read or Write. The search field comprises the K field together with the fields to the left of an oblique stroke(/). The search argument consists of the contents, at the start of the cycle, of the I/O register being used. The I/O register used is indicated by the names of the fields. To the right of the oblique stroke the fields over which reading or writing are preformed are listed. If a Next or Previous operation is performed, an U or P, respectively, is added in parenthesis. Beneath this information a short description of the operation is to be found. The lower portion defines the data store operation and has the same format as the middle portion. If a portion is blank no channel operation is taking place. At such a time, main store will generally be operating in conjunction with the CPU.

Figure 9:
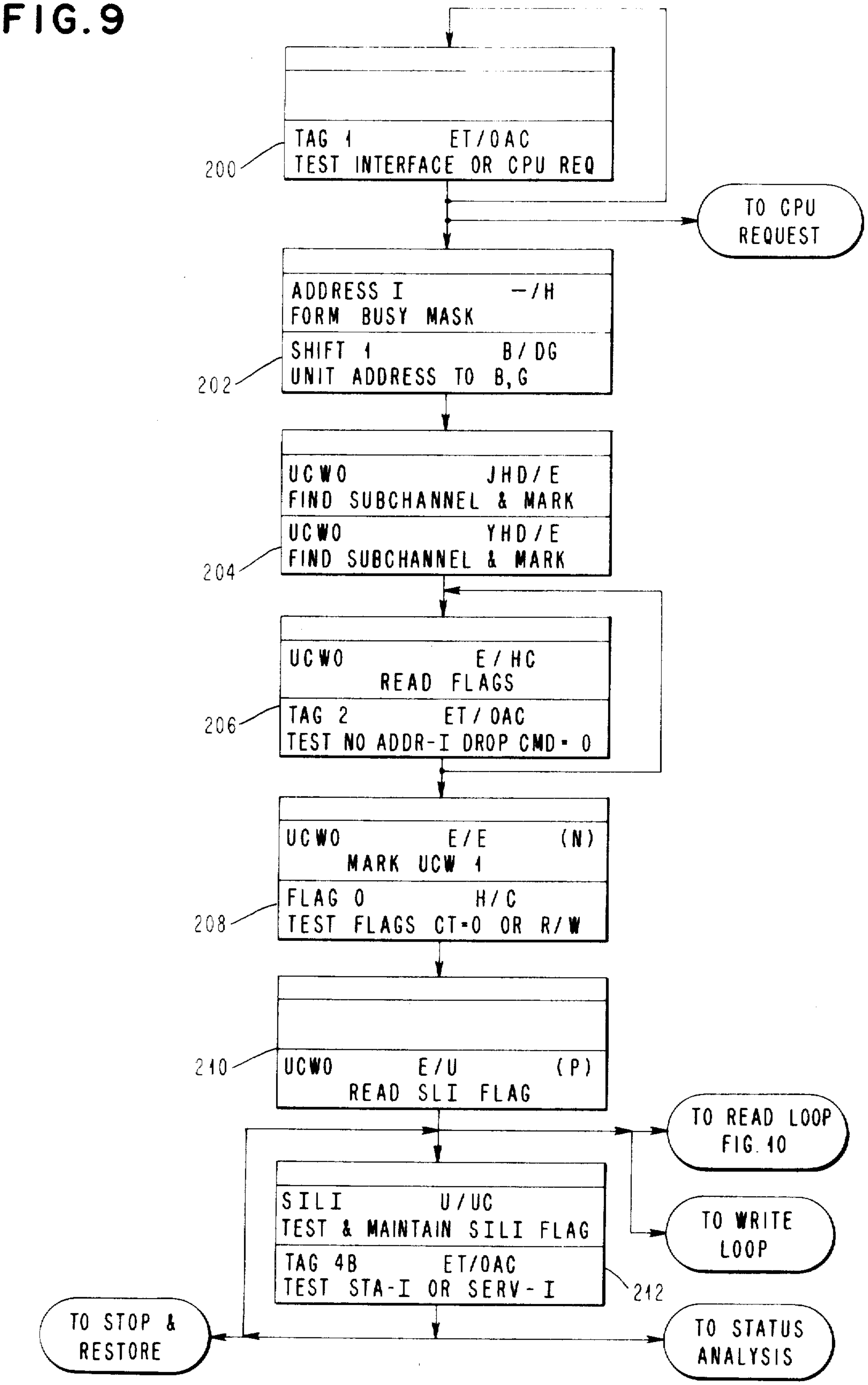
FIGS. 9 and 10 are logic flow diagrams of operation sequences performed by the channel.

FIG. 9 shows the portion of a channel operation concerned with data service initialization. This involves making initial contact with an I/O control unit either as the result of a CPU request or at the request of the control unit itself. It is an important feature of the separated multiplex channel that the sequence of signals transmitted by the channel to the control unit can be transmitted simply by accessing stored tables in the channel. This obviates the necessity for making complicated special purpose circuits for detecting and responding to the signals from the control unit. FIG. 9 deals with initialization when the request is received from a control unit. At the start the address, data and control stores are idling. Data store 23 is looping in a Search, Read operation with a search argument consisting of Tag 1, the E and T fields of I/O2. The T field receives data from Tag-in register 39. Read takes place over fields O, A and C. As long as the Tag-in register contains no data, the first line of Tag 1 table (FIG. 6A) is selected and the contents of the O, A and C fields are zero.

The first signal to appear from the control unit is Request-in which selects the second line of the Tag 1 table. The O field of this line contains a bit which is transmitted to the control unit from Tag-out register 41 gated by a signal on cable 43 responsive to the bit in order 7 of the line, and is interpreted by the control unit as a Select-out signal. The C field is still 00 so that the store loops on the same operation waiting for the initial signal interchange to be completed. The next signal to come from the control unit is Operation-in. Line 3 of the Tag 1 table is selected but no response is made. It is only when Operation-in is accompanied by the signal Address-in that line 4 of Tag 1 is selected and a response of Command-out is generated. Simultaneously, the Bus-out register 40 is cleared due to the D field containing only zeroes, and a branch is made due to the C field containing 01. It should be noted that lines 5 to 10 of the Tag 1 table are selected by signals or combination of signals which are inadmissible at this time and have a C field of 11. This indicates an error and leads to the execution of a routine for signalling to the CPU that an error has occurred.

Simultaneously with Address-in, the control unit will have placed its address in the Bus-in register 44 and on the next cycle the data store with key shift 1, search field B, and read fields D and G, reproduces this address in the D and G fields of I/O1. On the same cycle the address store is preparing to search for the subchannel (Unit Control Word) to be used. The key is ADDR1 and the read field is H which results in a 1 being written in column 8 of I/O1 of the address store. Since the D and G fields of the address and data stores are connected by a bus, the unit address is now available in I/O1 of the address store.

In the next store cycle 204, the subchannel allotted to the control unit is marked. For the address store (FIG. 5) the key is UCW0, the search fields J, H and D and the write field is E. The UCW0 which is busy (B =1, field H, FIG. 5) and is allotted to the requesting unit is selected and marked by the J field being changed from 0 to 1. The data store key is UCW0 with search fields Y, H, and D and write field E which leads to the same result in the data store. The next step 206 in the interchange of signals between the control unit and channel must now take place. In the data store the key is Tag 2 with search fields E and T and read fields O, A and C. The test is for the presence of the Address-in signal from the control unit. While it is present, the first line of the table is selected and the store loops on this operation emitting a C field of 11. When the signal ceases, the last line of the table is selected and the signal Command-out is suppressed by forcing zeroes into the Tag-out register from the O field. Meanwhile (Block 206, FIG. 9) the address store has been testing the flags previously placed in the subchannel by the CPU. The key is UCW0 with search field E and read fields H and C. A C field of 01 is emitted. It will be recalled that until Command-out is suppressed the C field emitted by the data store is 11. Since the C field received by the control store is the superimposition of the C fields from the address and data stores until Command-out is suppressed, the control store will receive 11 and will cause repetition of the operation in both stores. Accordingly, the address store loops on the read flags operation until the data store unblocks the C field of the address store by emitting 00.

On the next cycle 208 after the control store receives a C field of 01, the addreess store with a key UCW0, a read field of E, a Next operation, and a write field of E marks the UCW1 of the same subchannel as the marked UCW0. In the data store the flags are tested to determine the next stage of the operation. The key is flag O with search field H and read field C. The contents of the H field are taken from the address store output of the previous cycle. There are three choices which are signalled by three different C fields emitted by the flag O table. If the Count = O flag is present, data read or write is not to take place. Alternatively, in accordance with whether the R/W flag is 1 or 0, a read or write of data is to follow. To read data, in this context, means to transfer data from the control unit to main store. In the next cycle the address store does no operation while the data store uses the interval before a branch is possible to determine if an SLI flag is present. This flag determines whether a check is made that data which has been or is being transferred is of a predetermined length. Although it is not proposed to describe the use of the SLI flag any further, the description of the store cycle has been included to indicate how operations can be inserted into the store cycle which forms the interval before a branch can be made. If it is assumed that the Count = O flag is present there still remains a choice of stopping the operation and of proceeding with a status analysis of the control unit. On the next cycle or cycles the data store tests for the presence of a Status-in or a Service-in signal. If the Service-in signal is detected, the channel responds with Command-out, indicating stop. If Status-in is detected, this indicates that the control unit has put some control information on the Bus-in line. The channel then proceeds to analyze this information in a routine called status analysis. The stopping procedure and status analysis will not be described, but the tables enabling performance of these routines are included in FIGS. 5 and 6.

Figure 10:
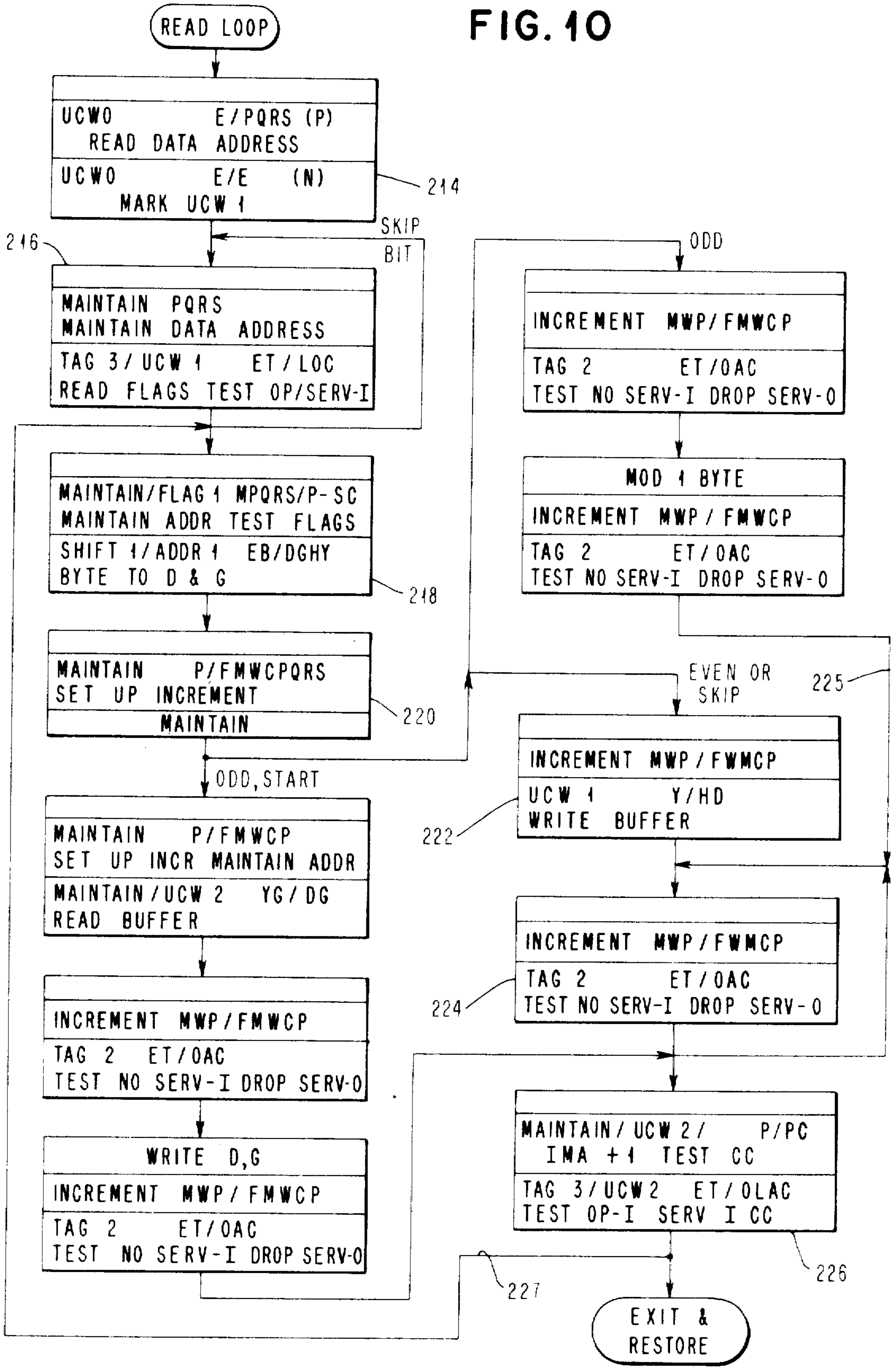

Referring to FIG. 10, in the first store cycle 214 of the read loop, with a key UCW0, a search field E, a Previous operation (P) and the read fields P, Q, R, and S, the data address is read from the UCW2 of the subchannel with the marked UCW0. In the data store, with key UCW0, search field E, a Next operation (N) and a write field E, the UCW1 of the marked subchannel is marked.

On the next cycle 216, the address store maintains the data address on P, Q, R and S of I/O2 preparatory to incrementing it. In the data store two functions are performed. Using a key of Tag 3, search fields E and T, and read fields O and C, the combination of signals Operation-In and Service-in from the control unit is looked for. As long as only Operation-in is present the first line of table Tag 3 is selected and the store loops on this operation. When both required required signals are present, line 4 of Tag 3 is selected and the channel responds by putting a bit representing Service-out in the Tag-out register 41. Simultaneously with Service-in, the control unit has put the first byte of data on the Bus-in line 29. Concurrently with the signal interchange, the data store, with key UCW1, search field F and read field L (column 14 of the store), is transferring the skip flag to I/O2 of the address store.

On the next cycle 218, the address store maintains the data address on field P, Q, R and S, of I/O2 and via key Flag 1, search fields M and P, Q, R, S, determines the stage of data transfer in which the channel finds itself.

Transfer of data to main store usually takes place two bytes (16 bits) at a time, whereas transfer from the control unit takes place one byte at a time. The procedure is that a byte with an odd data address (an odd byte) is immediately transferred to main store. If an even byte has been received by the channel from the control unit, this is transferred with the odd byte. When an odd byte is received by the channel it is necessary, therefore, for the channel to know if an even byte is awaiting transfer. It is also possible that skip will have been commanded. In this case, data is transferred from the control unit but is not transferred to mainstore.

The Flag 1 table (FIG. 5) detects whether the lowest order of the data address is odd or even (column 38), if a skip flag is present (column 13) and if a start bit is present (column 14). A start bit is the means whereby the channel records that it has already started to accumulate data for a two byte data transfer, and as will be explained, is written into column 7 of the data store if an even byte is received from the control unit by the channel. The bit is made available to I/O2 of the address register over one of the lines connecting the L fields in the data store and the M field in the address store. As a result of the operation on the Flag 1 table, one of three branches is chosen. If the skip flag is one or if the data address is even, line 2 or 3 of Flag 1 with C field 00 is chosen, and the data byte is stored in the data store and is not transferred to main store. With the skip flag zero, data address odd and start bit one, line 4 with C field 10 is chosen, and the odd byte and the preceding even byte are transferred to main store. With the skip flag zero, data address odd and start bit zero, line 1 with C field 01 is chosen and only the odd byte is transferred to main store.

On the same cycle 218 the data store is preparing to write the start bit and is accepting the data byte now on Bus-in. With key Shift 1, search field B and read fields D and G, the data byte is reproduced in the D and G fields of I/O1. Simultaneously with key Adder 1 search field E and read fields H and Y, ones are placed in the Y field and column 7 of I/O1.

During the next few store cycles the address store increments the data address. A full description of this procedure has been given in the complete specification of copending U. S. application Ser. No. 82,043, filed Oct. 19, 1970, to which reference should be made. According to the number of carries generated by the increment, the procedure can take three, five or seven store cycles. In what follows it will be understood that if necessary, the data store repeats an operation until incrementing is complete. As explained in the above-mentioned specification, the incrementing procedure is auto-sequencing and requires a minimum of external control. While incrementing is starting in the address store, the information on the I/O registers of the data store is maintained.

The branch starting with block 222 of FIG. 10 is chosen if the skip flag is one or if the data address is even. In the data store, with key UCW1, search field Y and write fields H and D the data byte in the D field of I/O1 is written into the buffer field of the marked UCW1 and the start bit is written into column 7 of the same word.

On the next cycle 224 with key Tag 2, search fields E and T and read fields O, A and C, a test is made for the absence of Service-in on the Tag-in bus in which case, channel responds by dropping Service-out.

On the next cycle 226 of the data store a key of Tag 3, search fields of C and T and read fields of O and T are used to test for the presence of Operation-in and Service-in. If the signals are detected, the read loop is reentered 227 since the control unit has another byte of date for transfer. If only Operation-in is present, the store loops 225, waiting either for Service-in to appear or Operation-in to drop. In the data store the incremented data address is compared with the last address in UCW1. With a key UCW1, search field P, Q, R and S and read field C an attempt is made to access UCW1. If it succeeds, data transfer must stop and the Count = O flag is put to one.

The other two branches shown in FIG. 10 will not be described in detail. In the left-most branch, which is for the case where an odd byte is received when a start bit is present, the odd byte is placed in the D field of I/O1 of the data store, the even byte is transferred from the buffer in UCW1 to the G field and both are transferred simultaneously to main store. In the right-hand branch, an odd byte is received with no start bit present, and is immediately transferred to main store.

The write loop is not described in detail since the above description is adequate for an understanding of the techniques adopted. The write loop differs from the read loop in that the buffer field in UCW1 is not used. Entry to the loop is the same as for the read loop. The previously obtained data address is maintained while a test is made for the Operational-in and Service-in tags. These cause a branch to test the low order bit of the data address. Two bytes of data are read from main store in the interval before the branch depending on the data address is made. If the low order bit of the data address is zero (the address is even), the byte in the D field of I/O1 of the data store is transferred to the Bus-out register by way of the A field of I/O2 and the Service-out signal is transmitted. If the low order bit of the data address is one (the address is odd), the byte in the G field of I/O1 is transferred to the Bus-out register and Service-out is transmitted. The end of the loop is similar to the read loop in that there is an exit unless Service-in is returned by the control unit and the last address is not equal to the incremented address.

In order to illustrate the operative connection between the CPU and separated channel, the procedure followed when the CPU, rather than a control unit, initiates an I/O operation will now briefly be described.

The CPU request line leading to the U fields of the address and data stores in activated when the CPU has assembled sufficient data to initiate performance of an I/O instruction. A reply is sent to the CPU which then transmits the first two bytes of data to the channel. The bytes contain a 4-bit routine header and the unit address specified by the instruction. The header causes the channel to branch to a microprogram routine in accordance with the instruction to be executed and to locate an existing subchannel, i.e., a UCW already allotted to the named unit, or to select and allot a free subchannel. When the channel is ready to accept further data, it again signals the CPU which synchronizes with the channel and begins to transmit the remaining data, two bytes at a time, by way of SDR. The first two bytes are a command and an extension data address; the next two are a data address; the next two comprise the flags; and the last two are a last address. As the data is received by the channel, it is stored in the previously located subchannel area. Not all the byte pairs are necessarily transmitted to the channel.

The routines defined by the routine header vary according to the I/O instruction which the CPU is executing. If the instruction is Start I/O (SIO), all the eight bytes of data are transmitted to the channel. The device is selected and a condition code of zero is transmitted to the CPU. If initialization cannot be completed, condition codes of 11 or 01 are returned in accordance with the reason for non-completion. If a condition code of 01 is generated, information is returned to the CPU so that a channel status word (CSW) can be compiled.

There are four kinds of routines for a Test I/O (TIO) instruction. If it arises in the normal course of a program a routine similar to SIO is executed with the major difference that a subchannel is not allotted for future use. Unit and channel status bytes are, if necessary, sent back to the CPU. TIO arising as the result of a CPU interrupt by the channel when it recognizes the end of a data transfer (Channel End Interrupt), causes the CPU to send the address of the unit involved to the channel. The appropriate subchannel is located and the current data address, the last address, and the channel and device statuses are sent to the CPU. The subchannel is then cleared and freed for future selection. If TIO arises as the result of an interrupt generated by an I/O device (Device End Type Interrupt), the device causing the interrupt is selected and the channel and device end status are transmitted to the CPU. Finally, TIO can arise as the result of a program-controlled interruption (PCI) which is initiated by the detection of a PCI flag in the CCW being processed. The routine is similar to the routine after TIO due to a channel end interrupt, except that the subchannel is not cleared.

The instruction Halt I/O (HIO) stops execution of the current I/O operation at a specified I/O device, or subchannel. If the subchannel is operating in the burst mode, transfer is stopped and the device disconnected. If the channel is captured by the CPU when it is in a dead loop, and if the subchannel is busy, a Count = 0 flag is inserted. Otherwise, the device is simply disconnected.

There has been disclosed a particular form of multiplex channel embodying the invention. It will be understood, however, that the main features of the invention defined by the appended claims can be realized in ways different to those particularly described. The generation of the interchange of control signals by the use of table look-up in an associative store could be embodied in a conventional I/O channel as a separate feature, all the other functions of the channel being performed by conventional apparatus. Similarly, the provision of unassigned subchannels in an associate store can be a special feature of a conventional I/O channel, either alone or in combination with the table look-up generation of control signals.

It should be noted that the number of associative stores used in the channel is not a significant feature of the invention. If a less efficient channel is satisfactory, or if very fast stores are available, the functions of the address store and the data store can be combined in one store. Alternatively, it is possible to provide a higher degree of parallelism by providing further stores for performing some of the functions described as performed by the data and address stores. The question of the number of stores used resolves itself largely to a question of cost in relation to the efficiency required.

While the invention has been particularly shown and described with reference to the preferred embodiment thereof, it will be understood by those skilled in the art that foregoing and other changes in form and details may be made therein without departing from the spirit and scope of the invention.

What is claimed is:

1. For use in a data processing system, an input/output channel for controlling the operation of input/output control units comprising:
   - an associative store including an input/output register for storing a search argument used to search said store;
   - means for connecting said associative store to said control units, said means including interface signal lines, wherein the control of said control units necessitates an interchange of control signals between the channel and the control units over said interface signal lines;
   - means in said associative store for storing a function table, the entries in which comprise data representing control signals to be transmitted to one or more of said control units, by said channel, said entries arranged to be read from the table in at least one table lock-up operation; and
   - means for storing control signals from the control unit, or a selected control unit, in said input/output register to provide at least part of the search argument.

2. A channel as claimed in claim 1, wherein said means for connecting the associative store to said control units comprises a register into which selected data representing the control signals from a first portion of said associative store are transferred from the function table in the associative store.

3. A system as claimed in claim 2, wherein said register is connected to said control units through gating means controlled by control data read from a second portion of said associative store, whereby and wherein said selected data representing the control signals from a first portion of said associative store are selectively transmitted to said control units, or a selected control unit, under control of said control signals.

4. For use in a data processing system, an input/output channel for controlling a plurality of control units comprising:
   - a data associative store, including a plurality of freely assignable subchannel areas;
   - each subchannel area including a field for storing indicia indicating the assignment of one of said areas to a given input/output operation; and means for searching said data associative store with a search argument bearing a predetermined relationship to said one of said areas;

whereby for an input/output operation involving a given input/output control unit said area of the associative store is assigned to the storage of data relating to said operation, the area being freely selectable from the non-assigned areas of said plurality of freely assignable subchannel areas in the store.

5. A channel as claim in claim 4, wherein said subchannel area includes a field for storing in said subchannel area an address number uniquely associated with a selected control unit.

6. A channel as claimed in claim 4 wherein said subchannel area includes a field for storing marker data in said subchannel area, whereby a subchannel area assigned to a control unit currently communicating with the channel is marked.

7. A channel as claimed in claim 5 including:

means for marking a subchannel area assigned to a control unit currently communicating with said channel by storing marker data in said subchannel area; and means for accessing said subchannel area assigned to a control unit currently communicating with the channel by an associative search operation which uses the marker data but not the address number of the control unit as part of the search argument.

8. A channel as claimed in claim 4 including means in said subchannel area for the buffer storage of data to be transferred between said selected control unit and said channel.

9. A channel as claimed in claim 1, for use in a data processing system having a main store and an address decoder for addressing storage locations therein, said channel including an address associative store and a control associative store, first means connecting said address associative store to said main store address decoder for providing to said main store address decoder addresses of storage locations in main store to or from which data are to be transferred;

second means connecting said control associative store to said address associative store; and means in said control store arranged to emit control data sequences over said second connecting means whereby operation of said associative store and said address associative store is controlled, said associative stores operating synchronously.

10. A channel as claimed in claim 9, including third means connecting said control store to said data and address stores for the reception of modifying data, and means in said control store responsive to said modifying data such that the control data sequence emitted by the control store is determined by the modifying data.

11. A system as claimed in claim 9, wherein said third means connecting said data associative store, said address store, and said control store includes means for combining data from said address store and said control store so that the modifying data from said address store and said data store are combined by superimposition.

* * * * *